United States Patent
Rubenczyk

(10) Patent No.: US 10,027,995 B2
(45) Date of Patent: Jul. 17, 2018

(54) SYSTEM AND METHOD FOR GENERATING MEDIA CONTENT IN EVOLUTIONARY MANNER

(71) Applicant: TREEPODIA LTD., Herzliya (IL)

(72) Inventor: Tal Rubenczyk, Herzliya (IL)

(73) Assignee: TREEPODIA LTD., Herzliya (IL)

(*) Notice: Subject to any disclaimer, the term of this patent is extended or adjusted under 35 U.S.C. 154(b) by 0 days.

(21) Appl. No.: 15/362,840

(22) Filed: Nov. 29, 2016

(65) Prior Publication Data

US 2017/0214946 A1    Jul. 27, 2017

Related U.S. Application Data

(60) Provisional application No. 62/281,596, filed on Jan. 21, 2016.

(51) Int. Cl.

| H04H 60/33 | (2008.01) |
| H04N 21/234 | (2011.01) |
| H04N 21/442 | (2011.01) |
| H04N 21/236 | (2011.01) |
| H04N 21/25 | (2011.01) |
| H04N 21/854 | (2011.01) |

(52) U.S. Cl.
CPC ......... *H04N 21/234* (2013.01); *H04N 21/236* (2013.01); *H04N 21/251* (2013.01); *H04N 21/44204* (2013.01); *H04N 21/44222* (2013.01); *H04N 21/854* (2013.01)

(58) Field of Classification Search
CPC ...... H04N 21/80; H04N 21/812; H04N 21/83; H04N 21/8541
See application file for complete search history.

(56) References Cited

U.S. PATENT DOCUMENTS

| 4,827,330 | A | * | 5/1989 | Walsh | H04N 1/40093 358/452 |
| 8,468,056 | B1 | * | 6/2013 | Chalawsky | H04N 21/2547 705/14.41 |
| 8,479,228 | B1 | * | 7/2013 | Simon | G06Q 30/0241 709/219 |
| 8,484,679 | B1 | * | 7/2013 | Chtchedrina | H04N 21/4821 725/37 |
| 9,185,151 | B2 | * | 11/2015 | Bruckman | H04L 65/4076 |
| 9,761,278 | B1 | * | 9/2017 | Turley | G11B 27/36 |
| 2003/0037329 | A1 | * | 2/2003 | Piotrowski | H04N 7/0887 725/28 |
| 2003/0126598 | A1 | * | 7/2003 | Agnihotri | G06F 17/30787 725/32 |
| 2005/0204380 | A1 | * | 9/2005 | Lee | H04N 21/2662 725/25 |
| 2006/0184522 | A1 | * | 8/2006 | McFarland | G06F 21/608 |
| 2007/0239883 | A1 | * | 10/2007 | Glenn | G11B 27/034 709/231 |
| 2007/0288309 | A1 | * | 12/2007 | Haberman | G06F 17/30017 705/14.1 |

(Continued)

*Primary Examiner* — Pankaj Kumar
*Assistant Examiner* — Timothy Newlin
(74) *Attorney, Agent, or Firm* — Mark M. Friedman

(57) ABSTRACT

The subject matter discloses a system and method for creating content in an evolutionary process derived from genetic algorithms imitating biological natural processes, and for creating new original effective content which is not based only on predefined rules.

6 Claims, 4 Drawing Sheets

(56) References Cited

U.S. PATENT DOCUMENTS

| | | | |
|---|---|---|---|
| 2007/0294719 A1* | 12/2007 | Jost | H04N 7/16 725/32 |
| 2008/0077955 A1* | 3/2008 | Haberman | G06Q 30/02 725/35 |
| 2008/0086380 A1* | 4/2008 | Cohen | G06Q 30/02 705/14.64 |
| 2008/0155590 A1* | 6/2008 | Soukup | H04N 7/17336 725/34 |
| 2009/0046995 A1* | 2/2009 | Kanumuri | G06T 3/4053 386/328 |
| 2009/0187939 A1* | 7/2009 | Lajoie | G06Q 30/02 725/34 |
| 2012/0054777 A1* | 3/2012 | Xiques | G06Q 30/0277 719/318 |
| 2012/0124620 A1* | 5/2012 | Nishizawa | H04N 21/4316 725/34 |
| 2012/0260276 A1* | 10/2012 | Toyoda | H04N 21/4307 725/10 |
| 2012/0317271 A1* | 12/2012 | Funk | H04L 67/12 709/224 |
| 2013/0091243 A1* | 4/2013 | Harnevo | G06Q 30/00 709/217 |
| 2014/0136186 A1* | 5/2014 | Adami | G06F 17/2264 704/9 |
| 2014/0196071 A1* | 7/2014 | Terpstra | H04N 21/44008 725/19 |
| 2016/0094888 A1* | 3/2016 | Peterson | H04N 21/4821 725/39 |
| 2016/0119661 A1* | 4/2016 | Jonnadula | H04N 21/812 725/32 |
| 2017/0078719 A1* | 3/2017 | Bettendorf | H04N 21/23439 |
| 2017/0127127 A1* | 5/2017 | Zavesky | H04N 21/4126 |

\* cited by examiner

SYSTEM AND METHOD FOR GENERATING MEDIA CONTENT IN EVOLUTIONARY MANNER

FIELD OF THE INVENTION

This invention relates to the field of automated media content creation.

BACKGROUND OF THE INVENTION

There are several known systems that automatically generate audio and video content (hereunder media content) based on existing data, such as data feeds. The term data feed refers herein to an electronic file that includes data. Such data may be textual data, an image, a video and/or any other type of data. Content creation systems usually work using a pre-defined template and/or set of rules that determine how to create the content based on the data, along with random selection. The result is always limited to the structure of the template and to the pre-defined rules, and may vary only due to a random factor.

SUMMARY OF THE INVENTION

The term computer device refers herein to a device that includes a processing unit. Examples for such device are a personal computer, a laptop, a server, a tablet a cellular device and IOT (internet of things) device.

Embodiments of the disclosed subject matter provide a system and method for creating content in an evolutionary process derived from genetic algorithms imitating biological natural processes, and for creating new original effective content which is not based only on predefined rules.

One exemplary embodiment of the disclosed subject matter is a system and a method for creating effective media content from another media content using genetic algorithms and evolutionary process. The term media content parent refers herein to media content that is used by the system to generate new media content. The term media content child refers herein to a variation of one or more parent media content that is created based on algorithms for creating media content in evolutionary manner. Such algorithms are derived from the behavior of genetic algorithms. One example of such genetic algorithm is cross over which is a genetic operator used to vary the programming of a chromosome or chromosomes from one generation to the next. Another example is mutation which is a genetic operator used to maintain genetic diversity from one generation of a population of genetic algorithm chromosomes to the next. In one example a media content child is created by activating a cross over algorithm on two media content parents wherein each media-content parent is a variation of other media content. Thus, a tree structure of generated media content may be created from one or more external media content that are provided to the system. The term external media content refers herein to media content that is inputted to the system from external resources such as photos database or video database or stock image databases, or music databases.

In a certain embodiment, the evolution process of the media content may be performed until a certain objective is achieved. The method for measuring performance and for identifying to what level the objective has been reached is termed herein target function. Such target function can be, for example, measurement performance of the content. The performance may be determined by measuring internet activity as a result of broadcasting the media content. Such internet activity may be related to desirable actions of users who are exposed to the media content. Examples of such desirable actions are purchasing, clicking or rating or playing the media content. An optional process of natural selection (for example) can be activated, to select the more performing media content child and to improve the content over time by repeating the process. For example, the best performing children are used to create the new generations and so forth.

According to some embodiments, the rate of the improvement of the generation based on the target function may affect system's decision regarding how to create a new media content child; for example which media content parents, algorithms and parameters to select.

In a certain embodiment, one parent media content is sufficient to create a child media content. In a certain embodiment, two or more parent media content are required to create a child media content. In a certain embodiment an external media content may be used instead or in addition to other parents.

In a certain embodiment, a set of randomized rules and/or pre defined rules may be pulled from a data source and used as additional parent content.

In a certain embodiment, the system uses algorithms for creating media content in evolutionary manner that imitate biological processes for automatically create effective content to improve the performance of the media content over time in an evolutionary process over time.

According to some embodiments a set of media content parent is created using content creations tools such as for example audio and video editors. Additional external media content may be used as parents as well. The algorithms for creating media content in evolutionary manner are activated on selected parents (one or more) to create one or more media content children.

A pre-defined rules-base and or a random selection may be implemented to decide how to create the next generation of media content children. A pre-defined rules-base and or a random selection can be implemented to pull information from an external data source. When using the media content for advertising. Such information may include from example products, information about products, information about promotions, and more.

In a certain embodiment, the algorithm for creating media content in evolutionary manner can be implemented using a software code that activates a video editing tool and uses existing media content parents as input. Using for example a pre-defined rule that extract the first half of parent video A, extract the second half of parent video B, and combines the two parts to create one child video. The children content can be benchmarked with a defined target function such as for example performance as a video advertising (for example by generating more sales).

The next generation of media content can be created for example by selecting as media content parent media content of the highest rank and by re-activating the algorithms for creating media content in evolutionary manner on the selected media content parents. Few generations of media content can be pre created and media contents from different generations can be selected to create a new generation of media content. In some embodiments several algorithms and parameters may be used for generating media content children. Specific algorithms and parameters that create the more performing children according to the target function, and or that are resulting in quicker improvement of the objectives of the target function, may be promoted by the system to be used more frequently for the next generation.

For example, in one of the embodiments, parametric change may be applied on one or more of the parents that are utilized to create a child. The system can measure the rate of improvement when shifting to a certain parameter, comparing to shifting to other parameters, and accelerate shifts to parameters with higher improvement rate. For example, in the video domain, one of the selected methods to create new children may be changing the background color of a single parent video every time in one shift over the color scheme. If within a few shifts it is measured that such a change yields quicker increase in the performance of the children according to the target function and comparing to other methods, then this method is promoted and its presence is increased in the mix of methods to create new generations. Older generation can still be selected by the system as parents to create new generation, along with newer generations.

Specifically in the video domain, methods for creating new generations can be, for example, combining first X seconds from parent video 1 with Y last seconds from parent video 2. Another example can be using layers 1-X from parent video 1 with layers Z-Y from parent video 2. The mutation algorithm may change one or more properties of one or more media content and/or may combine media contents or mutated media contents. Mutations algorithms can be used, such as for example activating a color filter on the entire or part of parent video 1, and then combine it (or not) with parent video 2. One other example is replacing a certain part of the video with a random (or other selection way) part of another parent video. Harmony algorithms may be used to keep smooth flow of the child video. Parents from different type may be used as source for the algorithms for creating media content in evolutionary manner. For example, an audio parent can be combined with a video parent to create a new children video.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
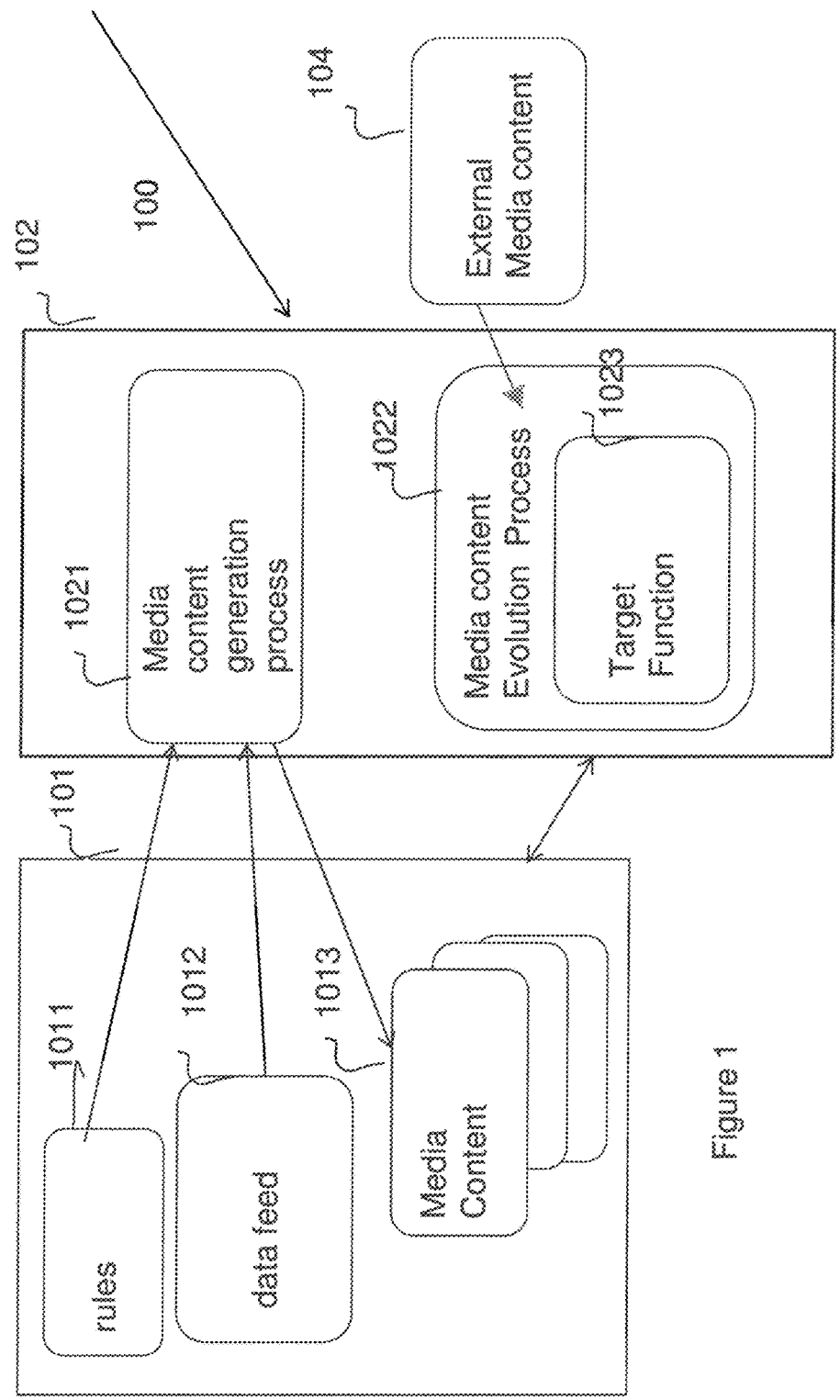
FIG. 1 shows a block diagram of a system for generating media content in evolutionary manner, in accordance with some exemplary embodiments of the disclosed subject matter.

FIG. 1 shows a block diagram of a system for generating media content in evolutionary manner, in accordance with some exemplary embodiments of the disclosed subject matter.

System 100 includes data repository 101 and a server 102.

The server 102 is configured for generating media content in evolutionary manner. The server 102 may generate new media content by a variation of existing media content and/or by combining portions from a plurality of media content. The variation and the combining may be performed according to rules and/or randomly.

The server may evaluate the performance of the generated media content and may repeat the process with the highest ranked media content until achieving the desired performance.

The server 102 may include a media content generation process 1021 and a media content evolution process 1022.

The media content generation process 1021 is configured for generating media content in evolutionary manner. The media content generation process 1021 may generate new media content by a variation of existing media content and/or by combining portions from a plurality of variation of media content and external media content 104. The variation and the combining may be performed according to rules or randomly. The variation may include changing the background color of a single parent video every time in one shift over the color scheme. The combination process may combine portions of a plurality of media contents.

The data repository 101 is configured for storing data related to the process of generating media content in evolutionary manner.

The media content evolution process 1022 is configured selecting the next generation of the media content according to the target function 1023. The selecting may be done according to performance of the content. The performance may be determined by identifying desirable actions of users who are exposed to the media content. Examples of such desirable actions are purchasing, clicking or rating. An optional process of natural selection (for example) can be activated, to select the more performing media content child and to improve the content over time by repeating the process. For example, the best performing children are used to create the new generations and so forth.

According to some embodiments, the rate of the improvement of the generation based on the target function may affect system's decision regarding how to create a new media content child; for example which media content parents, algorithms and parameters to select.

The data repository 101 includes rules 1011, data freed 1012 and media content 1013.

The rules 1011 may include parameters that are used for generating a media content child from one or more media content parents. Examples of such rules are choosing a first 5 seconds of a first media content and last five second from second media content. Another rule may be changing background color of a video. Another rule may be changing fonts. The rules may also include applying data feed 1012 on media content.

The data feed 1012 may include textual data, an image, a video and/or any other type of data which may be used for generating new media content.

The media content 1013 may include all the generations of the media content that are generated by the system. The media content 1013 may be structured as a tree in which the leaves include the most recent media content.

Figure 2:
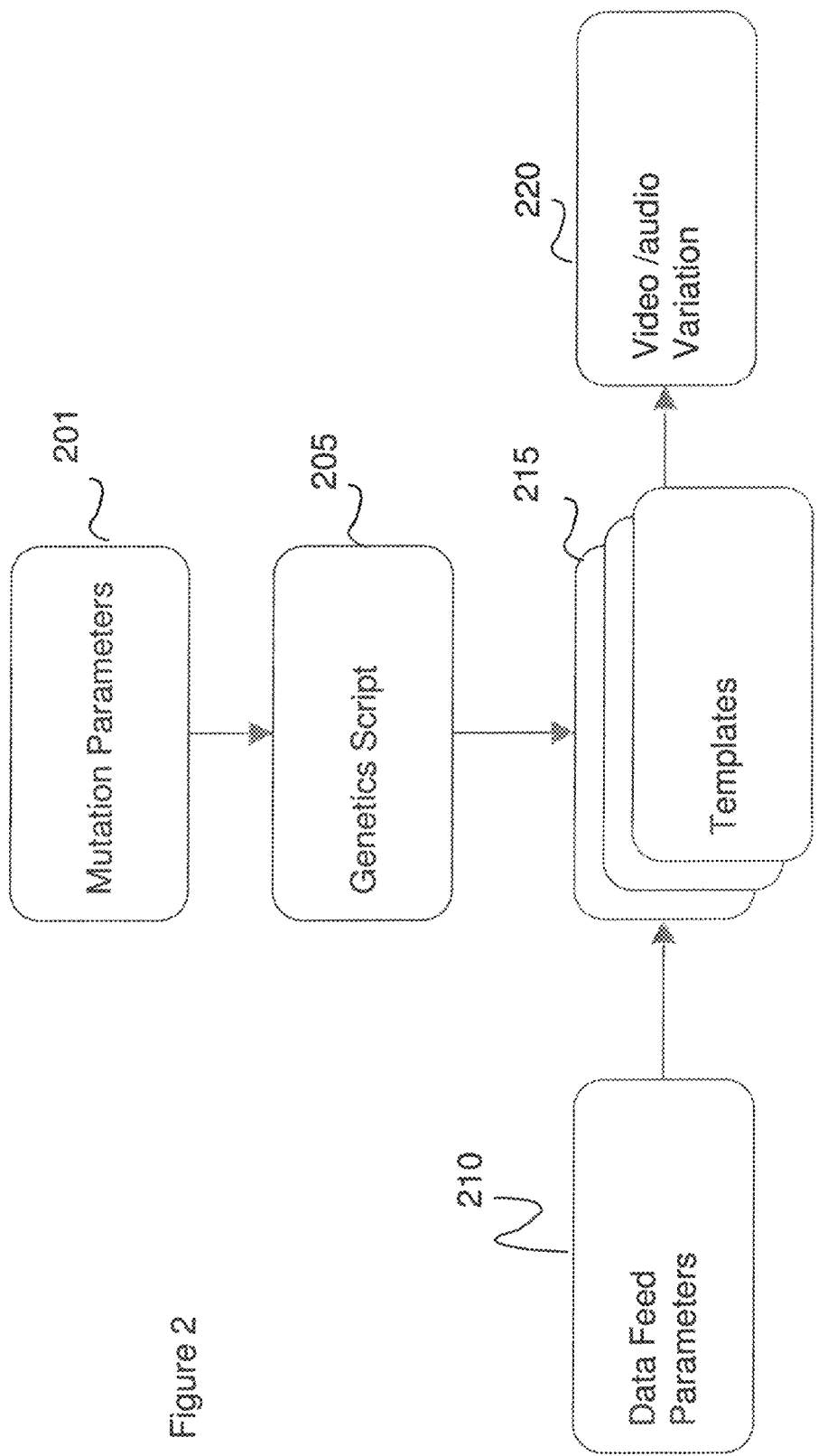
FIG. 2 shows a flowchart diagram of a method for generating a variation of media content, in accordance with some exemplary embodiments of the disclosed subject matter.

FIG. 2 shows a flowchart diagram of a method for generating a variation of media content, in accordance with some exemplary embodiments of the disclosed subject matter.

At block 201, the mutation parameters are received. Examples of such mutation parameters are which color filter to use, which media content (voice text etc) to combine, which time frame to select in each media content etc.

At block 205, the script for implementing the mutation parameters is generated. In some embodiment the script is a Java script that may be generated from pre-defined rules.

At block 210, the data feed is received. Such data may be textual data, an image, a video and/or any other type of data.

At block 215, the data feed and the script are applied on the one or more video templates.

At block 220, a video is created from the video template by using video editors.

Figure 3:
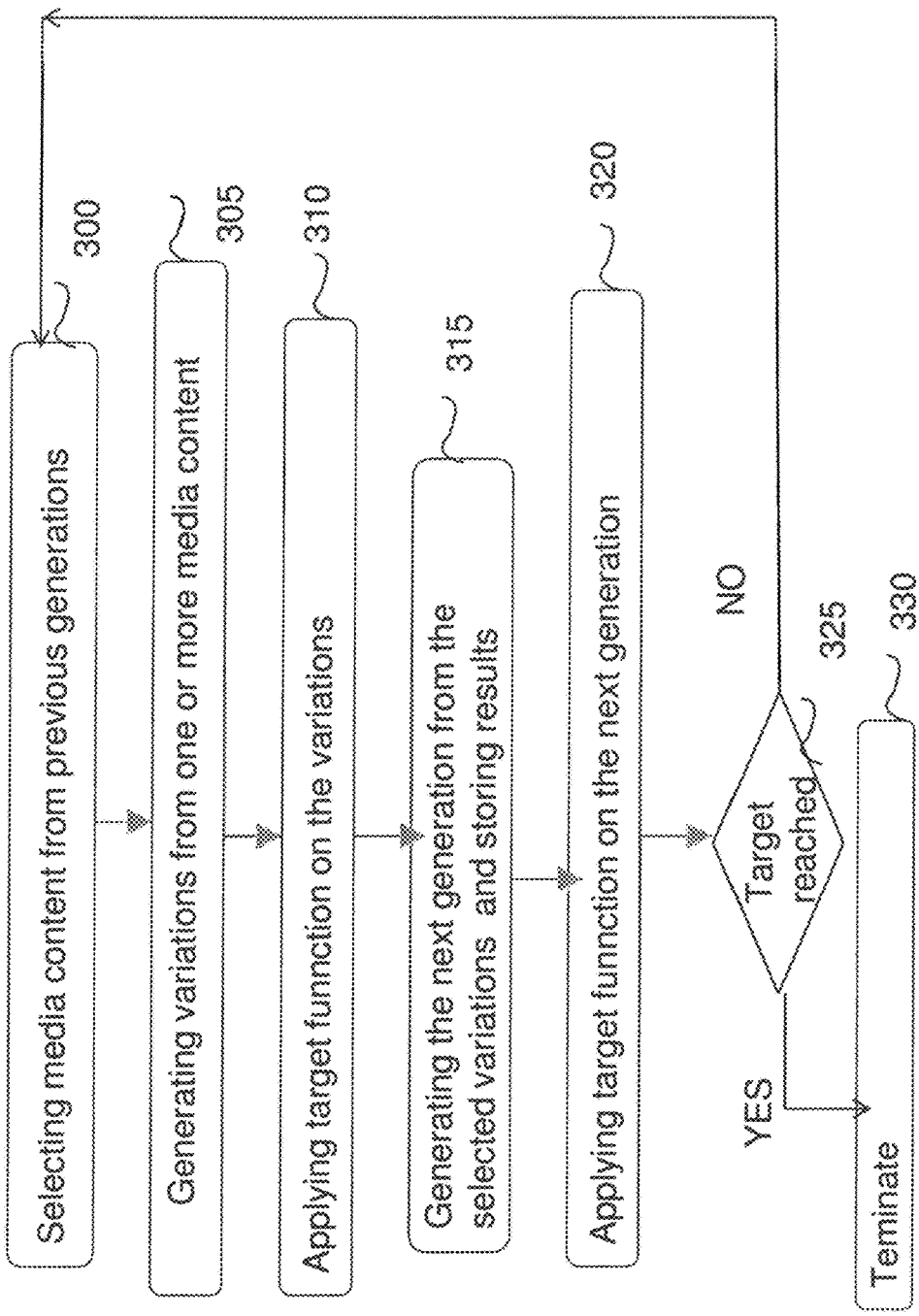
FIG. 3 shows a flowchart diagram of a method fir generating media content in evolutionary manner, in accordance with some exemplary embodiments of the disclosed subject matter.

FIG. 3 shows a flowchart diagram of a method for implementing the evolution process, in accordance with some exemplary embodiments of the disclosed subject matter. The implementing may be performed by machine learning algorithms. The method which may be passed on machine learning analyses the video success rate and generates a new generation of video based on the analysis.

At block 300 media content from previous generations is selected. The media content may also be selected from external resources.

At block 305 variations are generated from one or more media content. For example, a variation of a video may include a specific font for the text that is displayed on the video. The method for generating the variation is explained in greater detail in FIG. 2. The variations of the video content may be saved in a data repository. The variations of the video content may be broadcasted.

At block 310, the target function is applied on the variations. The target function may measure the rating of the broadcasted variation of video content, the ratio of the exposure of the video content to the purchasing of the video content and etc. The target function may select the most performing video content according to results of the measuring. For example the highest ranked video of a variation of font is selected from a series of variation of font of text on a specific video content. In another example the highest ranked video of a variation of the background color is selected from a series of variation of background color on a specific video content.

At block 315 the next generation is generated from a combination of selected variations. For example the selected variation of a series of changing font of text of a specific video is combined with the selected variation from a series of changing background color of the specific video. In some embodiment a tree structure that represents the evolution of the video content is updated. The next generation media content may be broadcasted.

At block 325 the target function is applied on the next generation media content for measuring an objective. Such objective may be ratio of playing the video content, ratio of performing an internet activity as a result of playing the video content and etc.

If the target function determines that the objective has been reached then at block 330 the process terminates, otherwise the process is resumed to block 300.

Figure 4:
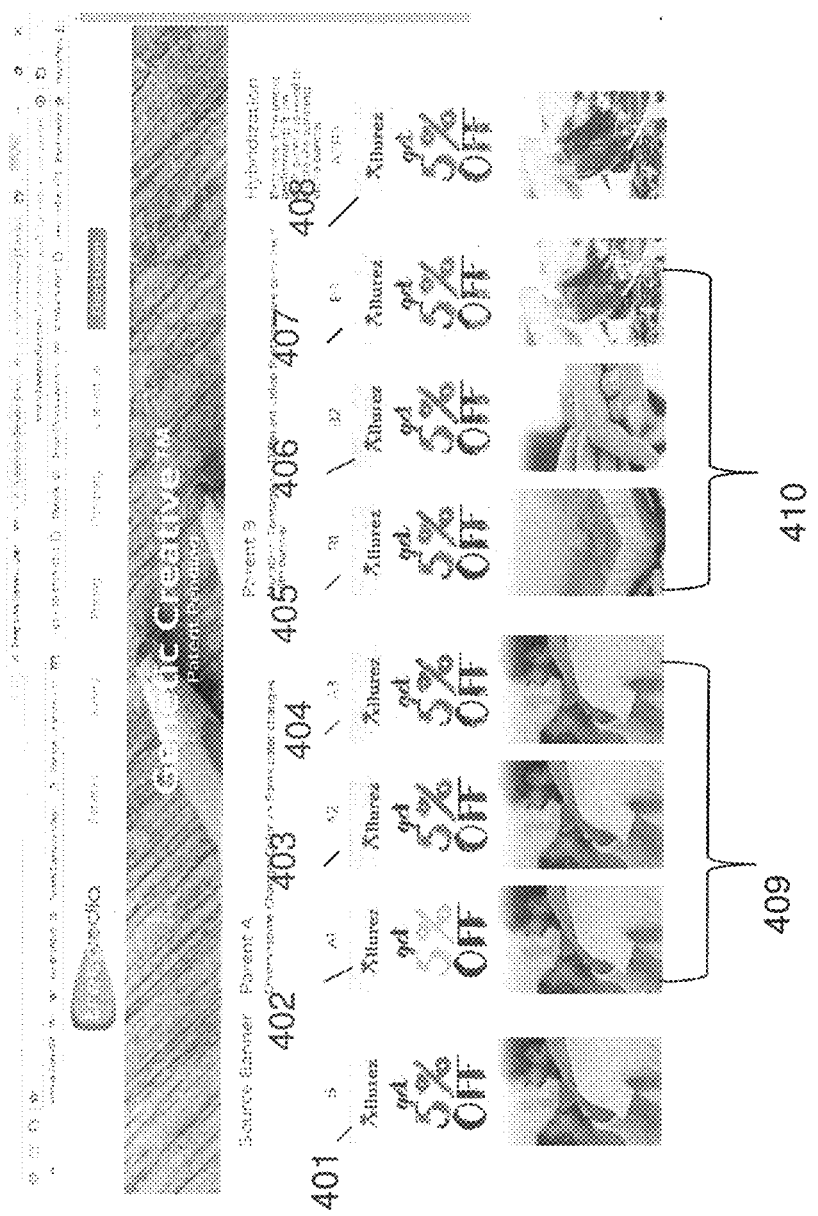
FIG. 4 shows an exemplary evolutionary scenario of creating media content, in accordance with some exemplary embodiments of the disclosed subject matter.

FIG. 4 shows an exemplary evolutionary scenario of creating media content, in accordance with some exemplary embodiments of the disclosed subject matter.

Group 409 includes variations 402 and 403 and 404 of the color of the text of media content 401. Group 410 includes variations 405, 406 and 407 of the background of media content 401. The color of the text 5% of 402 is green. The color of the text 5% of 403 is blue. The color of the text 5% of 404 is purple. The variation 403 is the most performing variation of group 409 and the variation 407 is the most performing of group 410. The system combines variation 403 with variation 407 such that the color of the text 5% of the combines video 408 is blue while the background of the combines video 408 is the same as the background of the variation 407. The combined video 408 is the next generation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should be noted that, in some alternative implementations, the functions noted in the block of a figure may occur out of the order noted in the figures. For example, two blocks shown in succession may, in fact, be executed substantially concurrently, or the blocks may sometimes be executed in the reverse order, depending upon the functionality involved.

What is claimed is:

1. A computer-implemented method, comprising:
 a. selecting a media content from a data repository;
 b. determining said media content as a next generation media content;
 c. selecting a visual or an audio attribute of said next generation media content;
 d. generating one or more variations from said next generation media content; wherein each of said variations is distinguished by a certain change in said attribute;
 e. broadcasting said one or more variations;
 f. measuring performance associated with internet activity related to each of said one or more variations;
 g. selecting a most performing variation from said one or more variations in accordance with said measuring;
 h. if performance of said most performing variation is greater than performance of previous generations of said media content stored in said data repository, determining said most performing variations as said next generation media content and storing said most performing variation in said data repository; and
 i. repeating c-h to create an evolutionary process.

2. The method of claim 1, wherein said generating one or more variations being in accordance with cross over algorithm.

3. The method of claim 1 wherein said media content being an audio file or a video file and further comprising interactively defining said next generation media content.

4. A computer-implemented method, comprising: at a server system laving one or more processors and memory, the method comprising:
 receiving a first media content and a second media content;
 selecting a visual or an audio first attribute of said first media content;
 selecting a visual or an audio second attribute of said second media content;
 generating one or more first variations from said first media content; wherein each of said one or, more first variations is distinguished by a certain change in said first attribute;

generating one or more second variations from said second media content; wherein each of said second variations is distinguished by a certain change in said second attribute;

broadcasting said one or more first variations;

measuring first performance associated with Internet activity related to each of said one or more first variations;

selecting a first most performing variation from said one or more first variations in accordance with said first performance;

broadcasting said one or more second variations;

measuring second performance associated with internet activity related to each of said one or more second variations;

selecting a second most performing variation from said one or more second variations in accordance with said second performance; and combing a first portion associated with said first attribute of said first most performing variation with a second portion associated with said second attribute of said most performing second variation to, thereby defining a next generation media content.

5. A computer-implemented method, comprising: at a server system having one or more processors and memory, the method comprising:
 a. selecting from a data repository a plurality of media contents;
 b. determining said plurality of media contents as next generation media content;
 c. generating a combined media content; said generating comprising combining portions from at least two from said next generation media content;
 d. broadcasting said combined media content and said next generation media content;
 e. measuring performance associated with Internet activity related to each of said broadcasted media content;
 f. selecting an at least to most performing media content in accordance with said measured performance;
 g. determining said selected most performing media content as next generation media content;
 h. storing said selected most performing media content in said data repository; and
 i. repeating c-h.

6. The method of claim 5 wherein said repeating is until said measured performance exceeds a threshold.

* * * * *